United States Patent [19]

Ritzl et al.

[11] Patent Number: 4,678,225
[45] Date of Patent: Jul. 7, 1987

[54] COVERED GOODS TRUCK, IN PARTICULAR SILO TRUCK

[75] Inventors: Antal Ritzl, Zurich; Jürg Zehnder, Uitikon, both of Switzerland

[73] Assignee: Swiss Aluminium Ltd., Chippis

[21] Appl. No.: 861,091

[22] Filed: May 8, 1986

[30] Foreign Application Priority Data

May 15, 1985 [CH] Switzerland .......................... 2086/85

[51] Int. Cl.$^4$ ............................................. B62D 33/00
[52] U.S. Cl. .................................... 296/181; 296/183; 105/392.5
[58] Field of Search ............... 296/181, 183, 184, 100, 296/210; 105/355, 392.5 R

[56] References Cited

U.S. PATENT DOCUMENTS

| 4,302,044 | 11/1981 | Sims | 296/100 |
| 4,585,266 | 4/1986 | Steinberg | 296/100 |
| 4,585,267 | 4/1986 | Friesen | 296/100 |
| 4,595,231 | 6/1986 | Bennett et al. | 296/181 |

Primary Examiner—Robert R. Song
Attorney, Agent, or Firm—Bachman & LaPointe

[57] ABSTRACT

The goods truck features a superstructure which is made up of interconnected longitudinal walls, end walls and floor and is designed to form a self-supporting body which twists relatively easily. The roof features at least one longitudinal part which is attached to one longitudinal wall and, with respect to the end walls and the other longitudinal wall, exhibits freedom of movement in the longitudinal direction which accommodates the twisting action. A charging port/charging ports can be provided in the roof. By employing the concept according to the invention the danger of derailment can be reduced, and fatigue crack formation avoided in the region of the roof.

19 Claims, 25 Drawing Figures

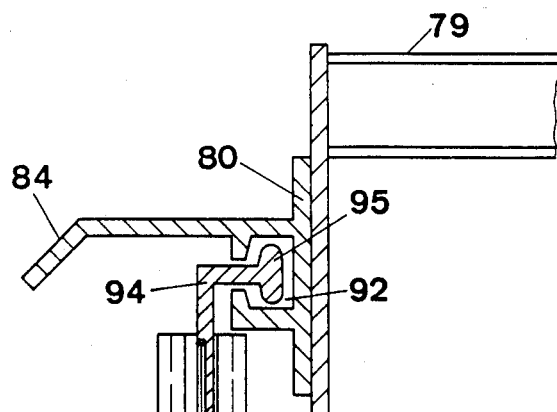
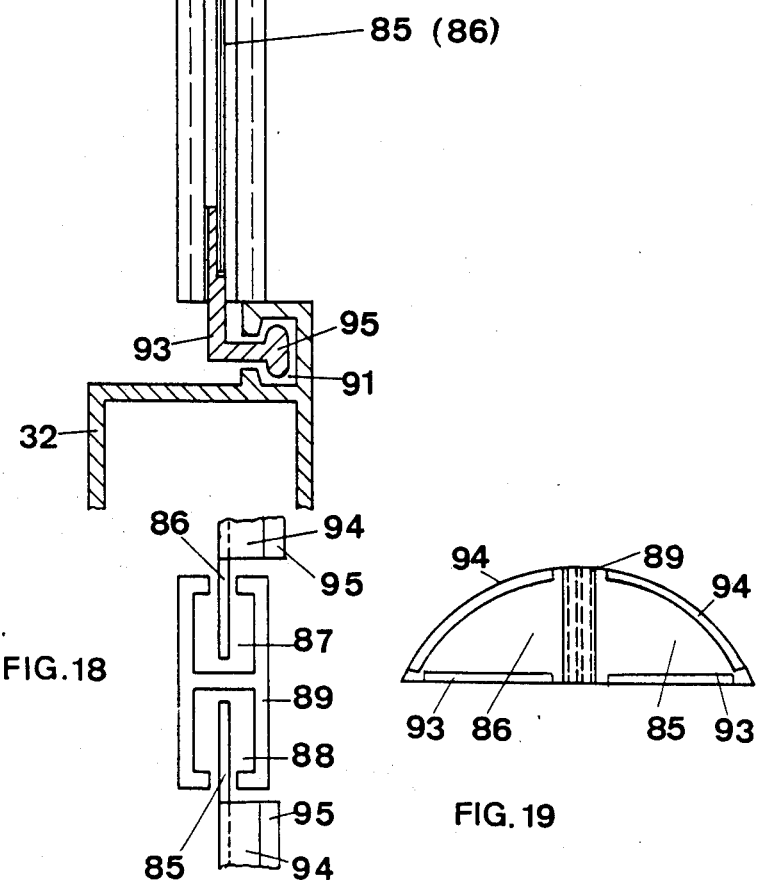
FIG.17
FIG.18
FIG.19

COVERED GOODS TRUCK, IN PARTICULAR SILO TRUCK

The present invention relates to a covered goods truck, in particular a silo type truck for pourable goods.

Goods trucks are usually such that the roof is attached to the truck walls on all four sides i.e. at the longitudinal and transverse sidewalls. This is also the case with silo trucks.

As a result of this kind of construction the superstructure of such goods trucks exhibits great rigidity which is in fact all the greater the heavier the load for which the truck is designed; the superstructure is correspondingly stronger in the same relation.

This high degree of rigidity results in various disadvantages. First, when running over uneven stretches of track, which can arise mainly at points and at inferior industrial railway tracks, such rigid superstructures are not able to adapt to the conditions. As a result, all stresses which would otherwise lead to twisting of the superstructure about its longitudinal axis are taken up and compensated by the springs of the bogie, which demands a large-to-excessively large spring deflection. Furthermore, some goods trucks for heavy loads have to be fitted with appropriate, strong springs which, consequently, exhibit little flexibility. Such strong springs are not very accommodating during the return journey of the empty truck to the filling station. For these various reasons the rigid superstructure construction represents an increased risk of derailment.

In addition, conventional goods trucks, in particular silo trucks or the like, often feature an opening or charging port for loading the truck wherein the said charging port is usually surrounded by a frame. In such goods trucks the above mentioned charging ports represent a weakening of the roof construction, all the more so because they extend over a greater part of the roof length, with the result that the superstructure no longer behaves as a rigid construction. The torsional stresses that arise while the truck is in motion then lead to a greater or lesser mutual displacement of the longitudinal side regions of the roof, producing peak or concentrated stresses in the region of the charging port; such stresses are capable of causing fatigue cracks in these regions. For a better appreciation of the circumstances mentioned above reference is made in the following to FIGS. 1 to 4 which show schematically, perspective views of conventional types of trucks.

FIG. 1 shows a goods truck 1 with longitudinal walls 2,3 and end walls 4,5, a roof 6 made up of three flat parts viz., two sloping parts 7 at the sides and a central horizontal part 8, the latter part 8 featuring an elongated, essentially rectangular charging port 9 which can be closed off by a flap-type cover 10.

FIG. 2 shows a silo truck 1 with funnel-shaped floor 11 and domed roof 12 featuring an elongated, essentially rectangular charging port 9 which can be closed off by a tiltable cover 13. Such tiltable covers are also found on trucks with roofs of angular cross-section as shown in FIG. 1. When torsional stresses arise during transport in truck superstructures as in FIG. 2, then both long sides 14 and 15 of the charging port 9 tend to be displaced, with respect to each other, in the longitudinal direction such that the rectangular charging port 9 is deformed into a twisted parallelogram. This deformation creates high stress concentrations in the narrow sides 16 of the opening 9 and peak stresses at the, possibly, rounded corners 17, which can lead to fatigue cracks forming in the mentioned regions 16,17.

FIG. 3 shows a goods truck 1, the roof 6 of which features many, closely-spaced round charging ports 18. Here the torsion stresses produced while the truck is in motion give rise to longitudinal shear stresses that are concentrated in the regions 19 of the roof sheeting between the openings 18 and between the first and last openings 18 and the superstructure end walls 4,5, creating stresses which can lead to fatigue cracks in these regions.

Shown in FIG. 4 is a goods truck which features in its roof 6 round charging ports 18 which are spaced wide apart and relatively far from the end walls 4,5. In such a case the charging ports 18 introduce practically no weakening of the roof 6. During transport therefore the superstructure behaves as though there were no charging ports i.e. as a superstructure with greater rigidity. The empty goods trucks then suffer the above mentioned disadvantage of risk of derailment; on the other hand the danger of forming cracks is negligeable.

There are of course situations which lie between those shown in FIGS. 3 and 4.

SUMMARY OF THE INVENTION

The object of the present invention is to develop a roof design for covered goods trucks, in particular silo trucks, which, while the truck is in motion, permits twisting of the superstructure and as a result eliminates the danger of derailment on uneven sections of tracks and also the risk of crack formation in the roof.

This object is achieved by way of the invention in that the truck superstructure, made up of interconnected longitudinal walls, end walls and floor, is designed as a self-supporting body that twists relatively easily, and the roof is made up of at least one longitudinal part which, with respect to the end walls and at least one longitudinal wall exhibits freedom of movement in the longitudinal direction of the superstructure.

As such the roof of the truck can be made up of one single part and have its free long edge supported on the upper edge of the second long wall of the superstructure such that it can be displaced lengthways.

The roof preferably features two longitudinal parts which can be slid longitudinally with respect to each other and which are securely connected at their long edges to one or the other long walls of the superstructure and are supported, such that they can be displaced at a distance from these connection points, directly or indirectly on component parts of the superstructure e.g. on the superstructure end walls.

Further, it is possible to construct the roof out of a larger number of longitudinal parts which can be displaced longitudinally with respect to each other.

If the roof features charging ports, then these can be provided in a closed part of the roof or between two appropriately shaped roof parts which can be displaced with respect to each other. A further development of the invention is also the connection of the roof parts to the end walls.

BRIEF DESCRIPTION OF THE DRAWINGS

The invention is explained in greater detail in the following description of exemplified embodiments with the aid of the schematic drawings viz.

FIGS. 17–19: Another version of the variations shown in FIGS. 14–16.

DETAILED DESCRIPTION

In the versions of the invention described hereinbelow the actual truck superstructure 1 e.g. a silo truck for pourable goods, features two longitudinal walls 2,3 and two end walls 4,5 which together and at the floor 11 of the superstructure, shown only in some figures, are joined securely together to form a self-supporting body which can twist relatively easily.

Figure 1:
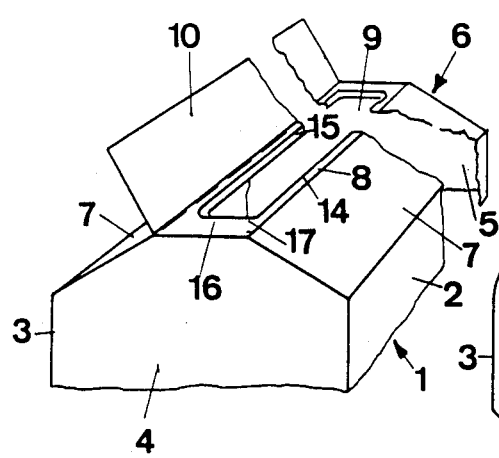
FIGS. 1–4: Schematic perspective views of conventional types of trucks.
Figure 2:
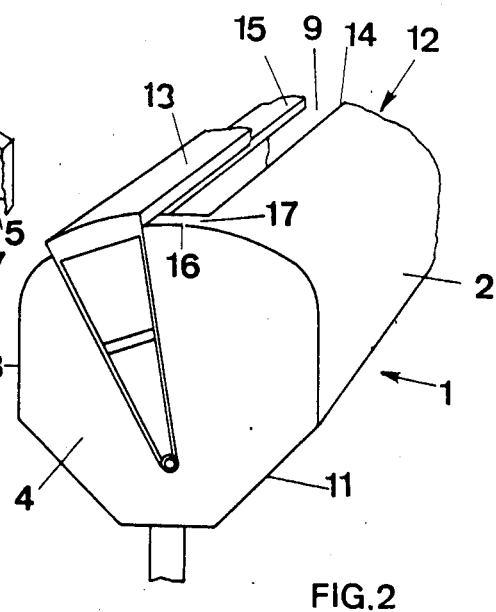
Figure 3:
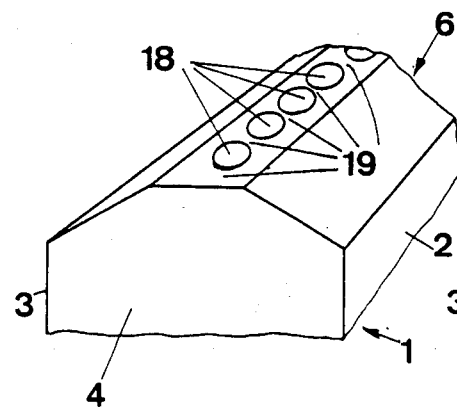
Figure 4:
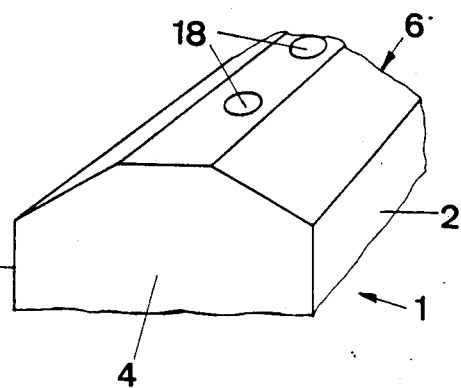
Figure 5:
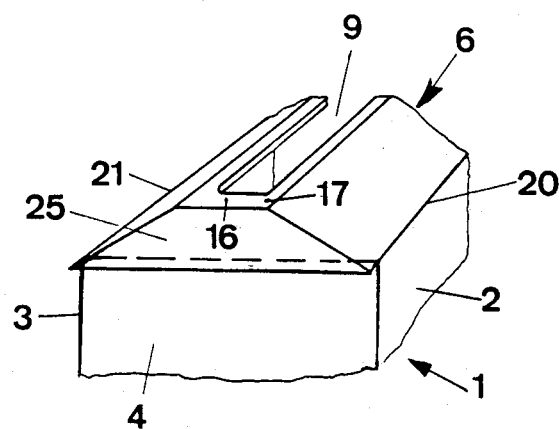
FIG. 5: A perspective view of a goods truck with a roof which is in one piece and is attached at one long edge.
Figure 6:
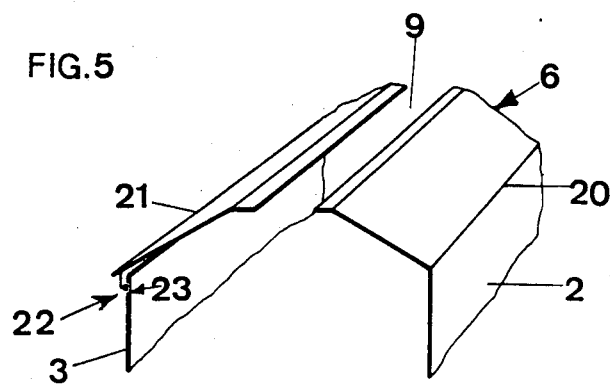
FIG. 6: A cross-section through, and perspective view of, the truck shown in FIG. 5 and featuring a means of support for the free longitudinal edge of the roof.
Figure 7:
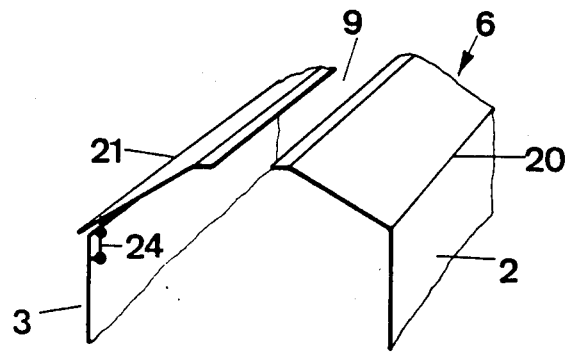
FIG. 7: A cross-section, and perspective view of, the truck shown in FIG. 5 featuring a different type of means for supporting the free longitudinal edge of the roof.

In the version shown in FIGS. 5–7 the roof 6 is in one piece and is attached at its long edge 20 to the upper edge or to the upper girder of the superstructure longitudinal wall 2. The other longitudinal edge 21 is supported by but moveable on the upper part of the other longitudinal wall 3 of the superstructure. This support can, as indicated in FIG. 6, be in the form of rollers 22 which run in rails 23 that are U-shaped in cross-section and are mounted on the long wall 3, or as in FIG. 7 by means of pivot arms 24, which are hinged at one end on the long wall 3 and at the other end on the roof 6, the arms shown here being stressed compressively along their length. At both ends the roof features a cover sheet 25 which forms the connection to the upper region of the end wall 4. The roof 6 can be a continuous covering or as shown can feature elongated charging ports 9.

A benefit of this kind of construction is that, while running on the track, the pliable superstructure can adapt to the effects of unevenness in the track not absorbed by the springs, and can twist accordingly so that the danger of derailment mentioned at the start no longer exists. In the process the roof 6 follows the movement of the longitudinal wall 2 to which it is attached and moves with respect to the other parts of the superstructure without being deformed out of its original rectangular shape. As a result the rectangular charging port 9 in the roof also retains its shape and is not deformed into the shape of a parallelogram. Consequently stress concentrations in the narrow side 16 and peak stresses in the corners 17 of the openings 9 are avoided and the danger of forming cracks in these regions eliminated. Shown in FIGS. 8 to 13 is a further version in which the roof 6 is divided into two longitudinal parts 26 and 27 which are attached to one or the other longitudinal walls 2,3 and are able to displace their free edges 28 or 29 longitudinally with respect to each other.

In this example the interconnected superstructure 1 is made up of the funnel-shaped floor 11, longitudinal walls 2,3 and end walls 4,5 which extend to about the same height as the long walls 2,3. Parts belonging to the superstructure frame are the upper longitudinal girders 30,31 of the longitudinal walls 2,3, the upper girders 32,33 of the end walls 4,5 and vertical corner and intermediate posts and lower girders not shown here. The actual covering of the walls and floors, made up of sheet or flat sections is attached to this frame.

The roof in particular comprises a narrower, inclined longitudinal part 27, which is attached to the upper girder 31 of the long wall 3, and a longitudinal part 26 which is made up of a broader, sloping part 34 and a horizontal part 35 and is attached to the upper girder 30 of the other longitudinal wall 2. At their ends both longitudinal parts 26,27 of the roof are fitted with angle sections 36 and cover sheets 37,38 attached to them, said sheets 37,38 providing the connection to the upper part of the superstructure end walls 4,5.

The free longitudinal edges 28,29 of both roof parts 26,27 are designed here such that they overlap. As shown in particular on the left in FIG. 12 one roof part e.g. part 26 can feature an edge section 39 at its free long edge which in turn features a channel 40 which is open on the upwards facing side and into which a downwards facing flange 41 on edge section 42 of the other roof element 27 engages. Both edge sections 39 and 42 exhibit sufficient play with respect to each other that the relative movement of both roof elements can take place without hindrance. In the case of longitudinal part 26 of the roof the transition from the sloping to the horizontal part 34 or 35 is formed by a corner section 43.

If the described longitudinal parts 26,27 together form a closed roof (without charging ports), then the open channel 40 forms a gutter for rain water. On the other hand the central horizontal part 35 of the roof can, in particular in a silo truck with charging ports, be provided with an elongated, rectangular charging port 9 (FIG. 12) which can be closed over by a tilting cover 13 or the like. It is useful to position, close to the charging port 9, the channel 40 which serves as a dividing gap and is delimited by the free longitudinal edges 28,29, in particular the edge sections 39 and 42; this ensures that the channel 40 can be covered by the lid 13 or the like. When the dividing gap lies close to the charging port 9, the edge section 39 forms the frame on the long side of the opening. With a covered dividing gap, however, it is also possible to design this edge section such that it is not continuous, but is provided only close to the end walls 4,5. The charging port 9 is then delimited at least on one part of its corresponding longitudinal side by the edge section 42 of the other inclined longitudinal part 27 of the roof.

At their ends and in the region of their free longitudinal edges 28,29 both roof parts 26,27 are supported, each by means of a pivoted supporting device 44, mounted on the upper girder 32(33) of the end walls 4(5). The supporting devices 44 shown in FIGS. 8, 9 and 13 feature pivot arms 45 that can be subjected to tensile loading. Mounted on the upper girder 32(33) is a bracket (46) which in the present case comprises two Z-shaped sections 47 and an angular head piece 48. This bracket 46 supports a fish-plate 49 which is directed towards the cover sheets 37,38 of the roof in order to accommodate a swivel pin 50. On the other hand an angle section 51 is provided at the lower edge of each roof sheet 37,38 a short distance above the upper girder 32. A fish-plate 52 is likewise attached to this angle section to accommodate a further swivel pin 53. Both swivel pins 50 and 53 project ou and accommodate a pair of appropriately perforated flat rods which serve as pivot arms 45. Each longitudinal part 26,27 of the roof is thus suspended at both ends, hinged by means of the brackets 46 via pivot arms 45; as torsional forces arise in the superstructure while in service the longitudinal parts 26,27 can move, at a distance from the longitudinal walls 2,3, in the longitudinal direction relative to the end walls 4,5 of the superstructure.

Further, the upper girder (32)33 usefully features an upright flange 54 which acts as a water barrier over which, advantageously, a flange of the angle section 51 with a run-off strip 55 projects. This arrangement prevents rain water entering the truck interior. The cover sheets 37,38 can be provided on the inside at the lower edge with a wide angle section 56; the gap between this and the upper girder 32(33) is bridged over by deformable rubber strip 57 or the like. This ensures that powder filled up above this level will not run out.

Figure 13:
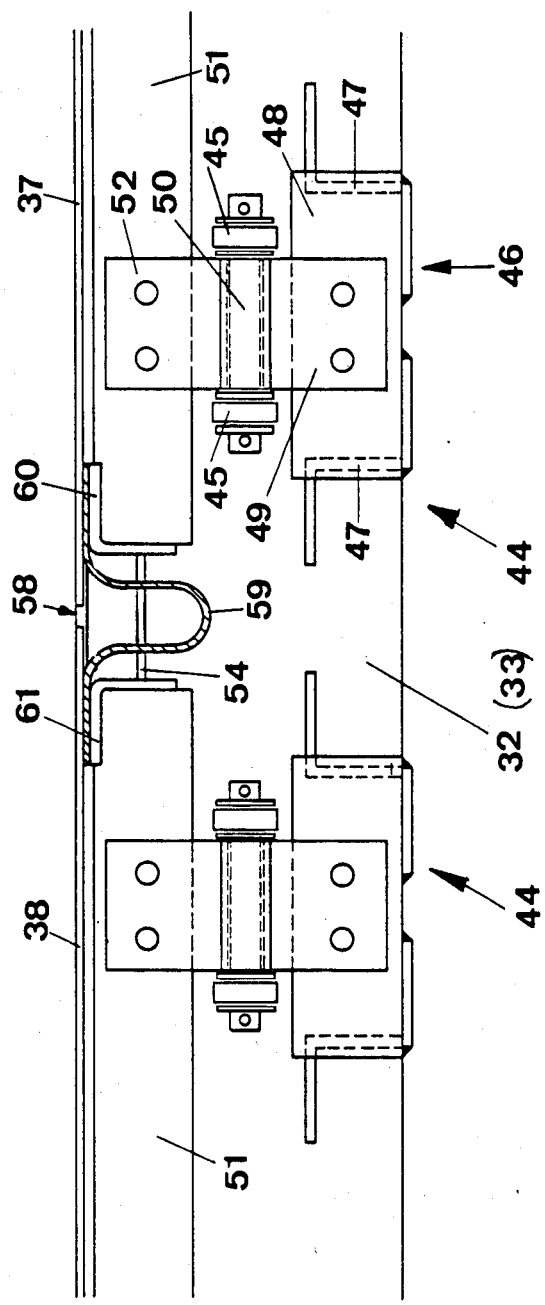
FIG. 13: A horizontal section below the top part of the truck roof showing in plan view the device for supporting the parts of the roof in the region of the end walls.

As a result of the above mentioned longitudinal relative displacement of the two roof parts 26,27 due to the twisting (torsion) of the superstructure, the coversheets 37,38 on both parts are no longer in the same plane. In order to ensure that a close fitting is still maintained between these sheets 37,38, the gap 58 formed by them is, as shown in FIG. 13, covered by a rubber loop 59 which is attached to the cover sheets 37,38 in question by angle-shaped sections 60,61 that act as reinforcement there.

For additional protection from the weather the tiltable cover can be provided at the end with a screening sheet 63 which is also attached to its supporting arm 62.

Figures 10, 11:
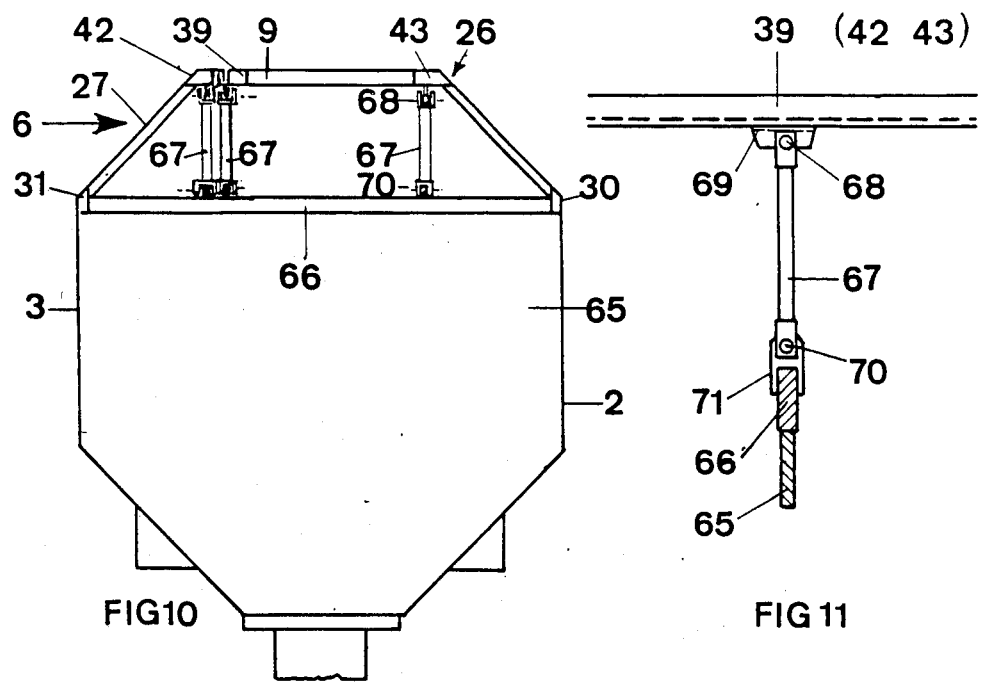
FIG. 10: a cross-section through the truck in FIG. 8 showing a view of a dividing wall and supports on the same for supporting the part of the roof.
FIG. 11: A support as in FIG. 10, shown here from the side.

The described silo truck is, as shown in FIGS. 10 and 11, usefully divided into compartments by dividing walls 65 each of which is attached to a stiffening section 66 joining the upper girders 30,31 of the longitudinal walls 2,3.

These sections 66 can be employed to provide further support for the parts 26,27 of the roof at appropriate intermediate points along its length by means of hinged pivot arms 67. To this end bearing pieces 69 for the pivot axis 68 are attached to the edge sections 39 and 42 and to the corner section 43, and for the lower pivot axis 70 bearing pieces 71 mounted on section 66.

If necessary the space between the reinforcing section 66 and the roof can be closed by extending the dividing wall 65 upwards or by inserting sheets or plastic panels, approximately so as with the end walls of the truck.

Figures 8, 9:
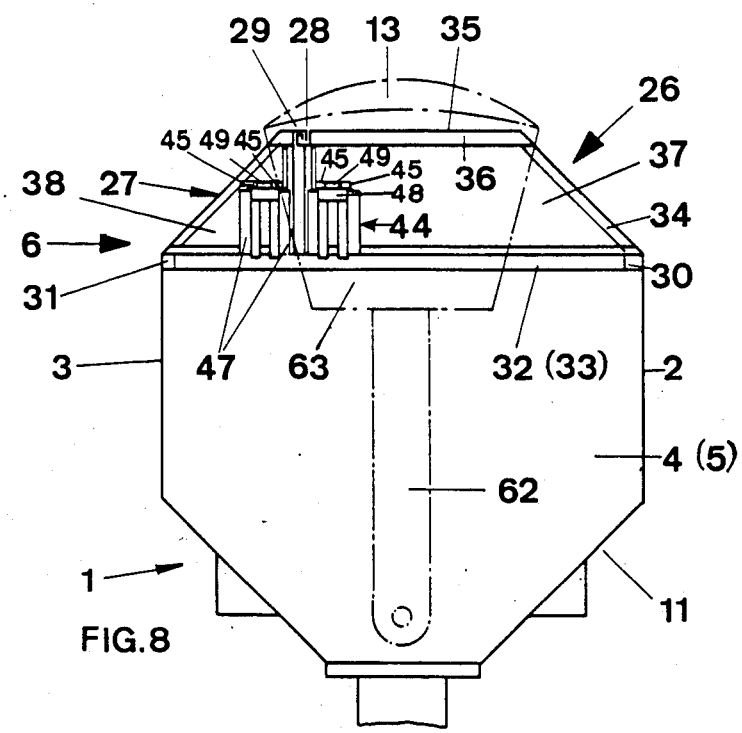
FIG. 8: An end view of a silo truck with a roof made up of two longitudinal parts.
FIG. 9: A longitudinal section through the upper part of the truck in FIG. 8, showing the region of an end wall, and a front elevation of a device employed to support the part of the roof.
Figure 12:
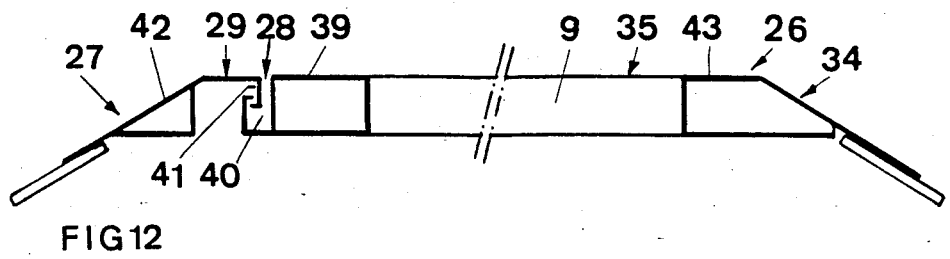
FIG. 12: A cross-section through a top part of the truck roof shown in FIG. 8; here on a larger scale.
Figure 12A:
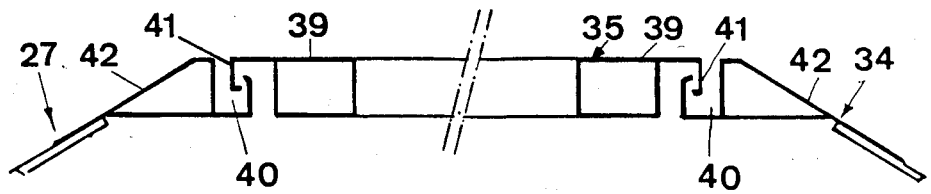
FIG. 12a: A cross-section through a modification to the top part of the truck roof in FIG. 12, suitable for a three-piece roof.

According to another variant of the exemplified embodiment described with the aid of FIGS. 8-13 it is also possible to construct both parts 34,35 of the broad roof part 26 as individual parts. The roof is then made up of three parts viz., two similar sloping parts 27,34 attached to the sidewalls and an independent horizontal part 35 which can be fitted with the charging port/ports 9. With reference to the drawings this means that the right half of FIGS. 8, 10 and 12 are the mirror image of the left half, with the exception that, in order to permit easier installation of the middle part 35, the edge sections 42 feature a channel 40 and the edge sections 39 a flange 41 facing downwards (FIG. 12a). The independent middle part 34 can likewise be suspended on support devices 44. If necessary additional arresting means can limit the movement of the middle part 35 with respect to the side parts 27 and 34 of the roof.

A variant according to FIG. 12a offers the advantage that there is no difference between the inclined side parts 27 and 34, which simplifies the construction and manufacture.

Figure 16:
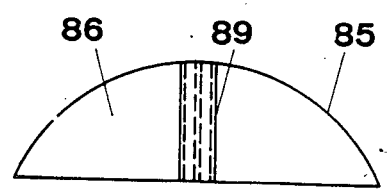

In trucks with superstructure sidewalls running up to about the same height as the longitudinal walls, the sheets between the end wall and the roof can also be mounted according to another principle than as shown in FIGS. 8, 9 and 13. This different principle is explained in the following in the form of two exemplified embodiments with the aid of FIGS. 14-16 and FIGS. 17-19. In both cases it concerns a roof made up of two longitudinal parts which fit together at the middle of the roof width and can slide relative to each other as can be seen from the end elevations shown in FIGS. 16 and 19.

Figure 14:
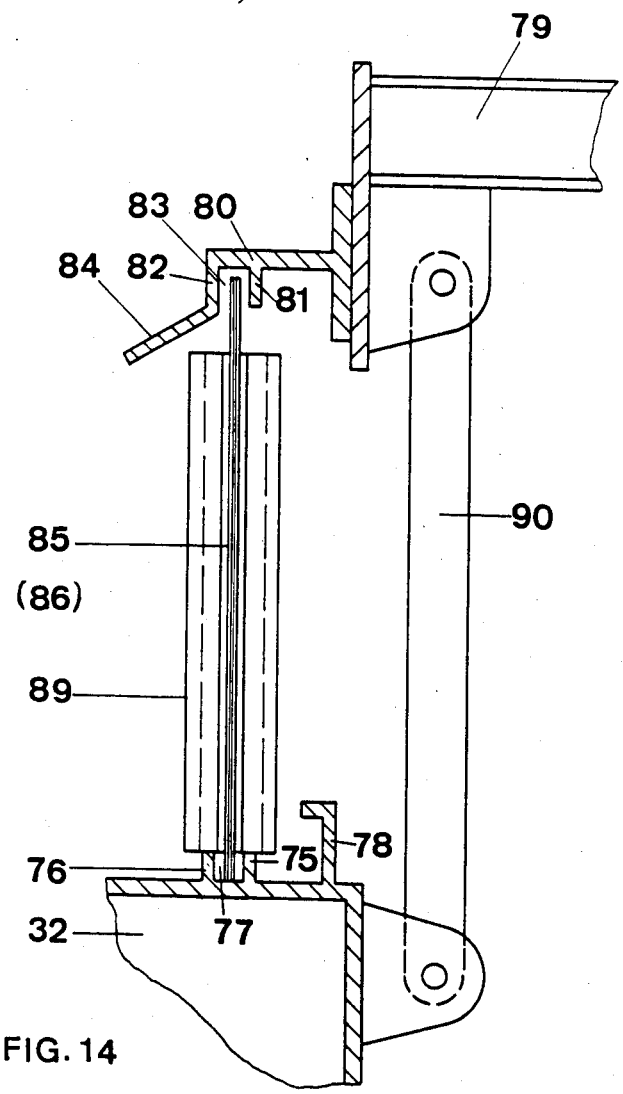
FIGS. 14–16: A variation in the arrangement of the cover sheets between the parts of the roof and the upper girder of the end wall, shown here in vertical longitudinal cross-section, horizontal plan view and end elevation.
Figure 15:
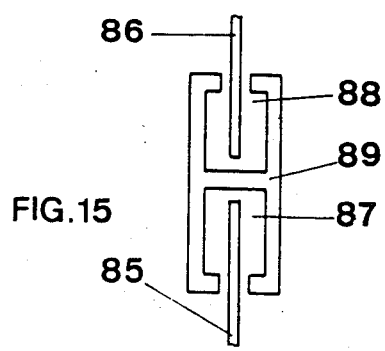

In the version shown in FIG. 14 the upper girder 32 of the endwall features two ribs 75,76 forming channel 77 which is open at the top, and behind this a flange 78 acting as a barrier to water. Attached to each of the narrow sides of the longitudinal roof parts 79 is a section 80 that features a channel 83 which is formed by two ribs 81 and 82 and opens downwards; the outer rib 82 can be extended as a sloping screen 84. The channels 77 and 83 provide a loose engagement for the upper and lower edge of sheets 85,86. Further, the vertical edges of both sheets 85,86 are loosely held in place in the undercut channels 87,88 of a loose vertical H-shaped section 89.

The longitudinal roof parts are supported at a distance from the longitudinal sidewalls of the superstructure by pivot arms 90 on the upper girder 32 on the end wall.

In the version shown in FIG. 17 the end wall upper girder 32 and the section 80 attached to the narrow side of longitudinal part 79 of the roof feature undercut channels 91 and 92 respectively which are open at the side. These channels loosely accommodate the head 95 formed on a flange on the angle section 93, 94, the upper and lower edges of sheets 85, 86 being welded to the other flanges on angle sections 93, 94. The vertical edges of sheets 85, 86 are again loosely engaged in the undercut grooves 87, 88 in a loose vertical H-shaped section 89.

The longitudinal parts of the roof are, usefully, as shown in FIG. 14 supported on the end wall upper girder 32 by means of pivot arms.

From the point of view of function, in both cases i.e. in accordance with FIGS. 14–16 and FIGS. 17-19, twisting of the superstructure leads to the end wall upper girder 32 becoming inclined with respect to the sections 80 of the respective longitudinal parts 79 of the roof, which in the process are displaced longitudinally with respect to each other. Consequently, the interlocking channels 77,83 (FIG. 14) or 91, 92 (FIG. 17) no longer lie in the same plane. Each of the sheets 85, 86 is therefore forced into a new position in that the edges slide in the channels 77, 83 (FIG. 14) or the beading 95 on edge sections 93, 94 slide along channels 91, 92 (FIG. 17); if the play provided there is not sufficient, sheets 85, 86 twist slightly. At the same time the loose H-shaped section 89 rotates about its longitudinal axis under the pressure of the vertical edges of the sheet.

Figure 21:
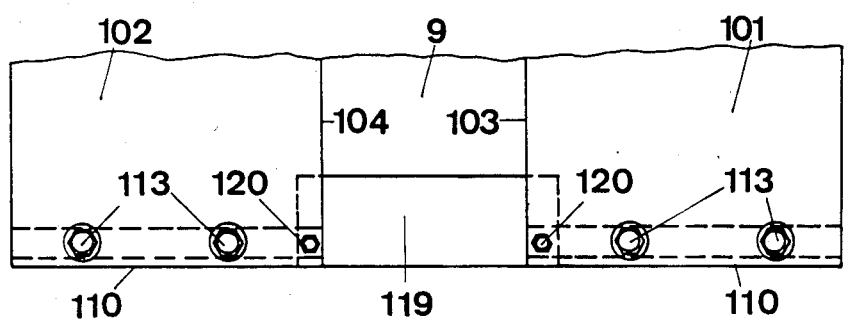
Figure 22:
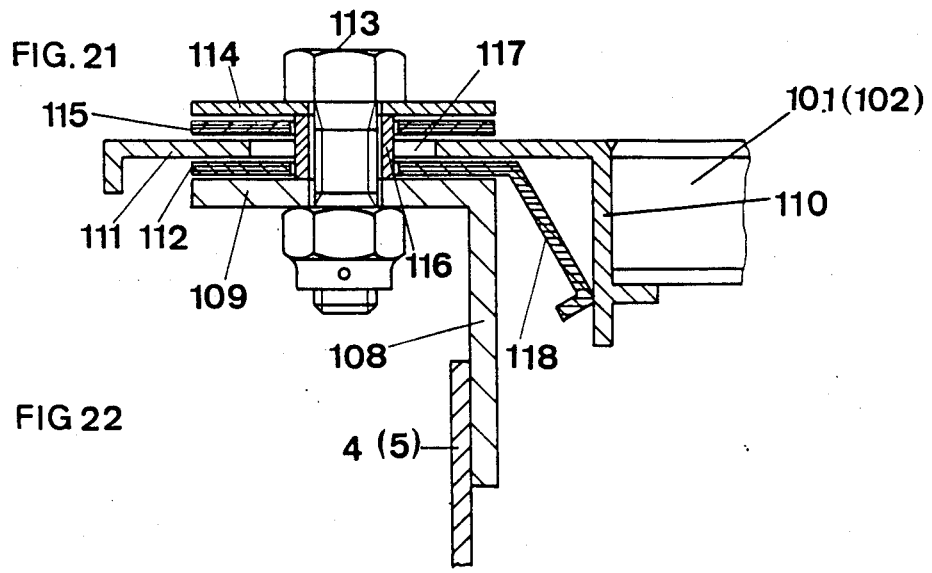

If necessary, the gaps can, at least in part, be sealed with flexible rubber strips or other sealing means. A further version of the invention is illustrated in FIGS. 20-22.

In this version the roof of the truck superstructure comprises two sloping parts 101, 102 each of which is attached to the upper edge of a longitudinal wall 2, 3 and this such that there free longitudinal edges 103, 104 are a distance from each other and thus delimit the elongated charging port 9.

In this version, in contrast to the aforegoing versions where the end sheets bridge the distance between the roof and the end walls of the superstructure, the end walls 4(5) of the superstructure extend up to the roof 6.

Figure 20:
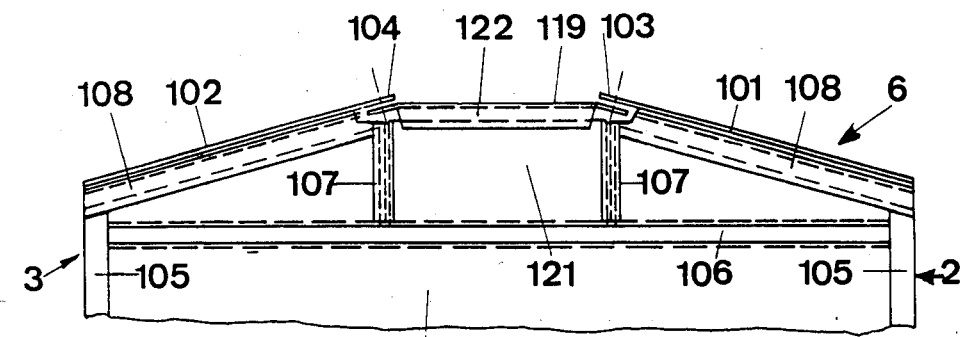
FIGS. 20–22: A further version of the roof construction, coupled to a superstructure end wall extending up to the height of the roof; shown here in end elevation, plan view and longitudinal crosssection.

As can be seen from FIG. 20 the corner posts 105, the upper girder 106, two small posts 107 mounted on this girder 106, and section 108 running parallel to the roof are all parts of the frame of the end wall 4(5). The sheets or the like of the end wall are welded to these parts of the frame.

The sections 108 are in the form of angle sections and offer via their flange 109 a contact surface for the sliding means of support of the narrow sides of roof parts 101, 102, as shown in FIGS. 21 and 22. In addition, the narrow sides of roof parts 101, 102 are provided with supporting section 110 with a bearing strip 112 e.g. of plastic such as polytetrafluorethylene (Teflon) between the flanges 111, 109. Between flange 109 and washer 114 is a spacer sleeve 116 which passes through the sliding washer 115, the flange and the bearing strip 112 so that, when the threaded bolt 113 is tightened, the flange 111 is held between the bearing strip 112 and the sliding washer 115 but is not tightly clamped there. Further, flange 111 features a hole 117 which is to accommodate the bolt 113 but is much larger than the outer diameter of the spacer sleeve 116. Thanks to this holding arrangement the roof parts 101,102 can slide and be displaced with respect to the angle section 108 and thus with respect to the end walls 4(5) if the superstructure twists. Further, in order to provide better sealing, the bearing strip 112 advantageously features a side flange 118 which presses with a springing action against the wall of the section 110.

In addition it is useful to border the charging port 9 at both of its narrow sides with an edge plate 119. As shown in FIG. 21 each such plate can be attached to the roof parts 101,102 by a bolt 120 such that the plates 119 can rotate. When twisting occurs, the end plate 119 positions itself such that it is inclined to both roof parts 101,102 and likewise to the end walls 4(5). When such an end plate as shown in FIG. 20 features a bent edge 122 which overlaps the upper edge of the middle sheet 121 in the end wall, care must be taken that there is sufficient space between that edge 122 and the sheet in order that the above mentioned mutual displacement can take place.

On the other hand it is possible to attach an angled end plate 119 to the upper edge of the middle end wall sheet 121 or to the small posts 107. This plate 119 then participates in the movement of the end wall 4(5) and, when the superstructure twists, mutual sliding displacement of the roof sides 101,102 and plate 119 then takes place.

Figure 23:
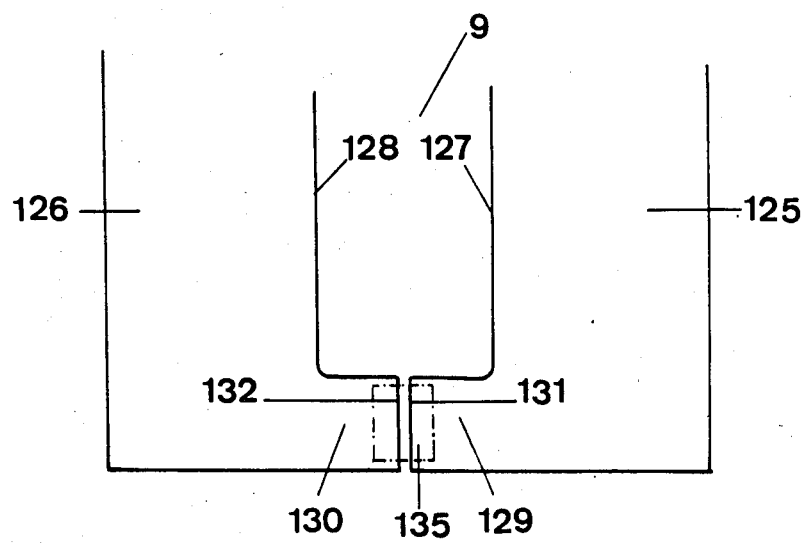
FIGS. 23–24: A further version of the roof construction shown in plan view and in cross-section.
Figure 24:
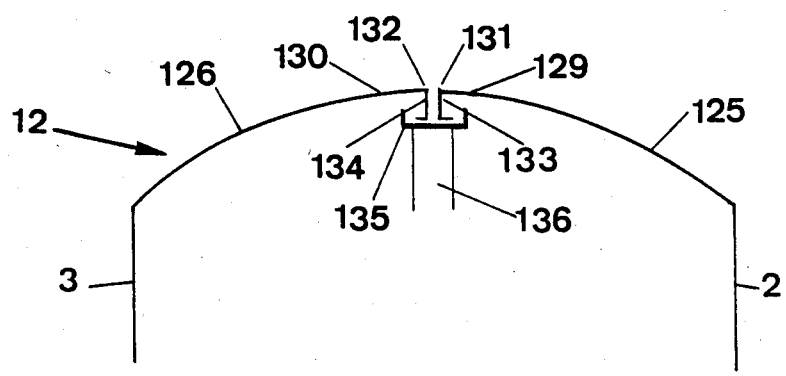

A further version of the roof parts is illustrated in FIGS. 23 and 24. The roof comprises two domed roof parts 125,126 which are attached to the upper edge of a sidewall 2,3 of the superstructure, and have their free long edges 127,128 a distance apart, thus delimiting the elongated charging port 9. The roof parts 125,126 each feature, at their end wall ends, a projection 129,130 which points towards the middle of the roof and which delimits the narrow sides of the elongated charging port 9.

As such, the free long sides 131,132 of these two opposite lying projections 129,130 can lie close to each other and feature a bent-over edge 133,134 which forms a support for a channel 135 of a bracket 136 attached to the end wall, said channel 135 being fitted with a layer of bearing material e.g. Teflon. When twisting of the superstructure occurs, this permits the roof parts 125,126 to slide with respect to each other and with respect to the end walls.

The various examples described here have been used to show various ways of designing roofing which is displaceable in the longitudinal direction, designing for the connection to the end and side walls, and the means of supporting. It is to be understood of course that variants of each of these design aspects are not necessarily to be combined as presented in the examples, but that as expediency requires other combination forms are also possible.

With respect to the deformations to be expected as a result of twisting in covered goods trucks, in particular silo trucks, of construction according to the invention, it can be said that the flat floor of such a truck or the floor of such a silo truck can experience twisting to such an extent that one corner is displaced an amount z amounting to some centimeters from the plane defined by the other three corners.

At roof height this corresponds to a longitudinal displacement of the longitudinal roof parts with respect to each other which is about 0.1 to 0.4 times the amount z i.e. z times B, reaching a value of about 1 cm or slightly above this. Across the breadth of the roof the deformation is of a much smaller magnitude. Roofs of the described modes of construction are, without question, capable of accommodating the resultant displacements.

Further, it is obvious that the twisting of the floor by a magnitude z in the vertical direction is transmitted fully to the roof height. As the roofing does not contribute at all to the strength of the self-supporting superstructure, but has simply to provide a cover, it can be made of a light construction. The individual displaceable parts of the roof (or a single piece, displaceable roof) can adapt and, without problem, accommodate twisting of the floor. The concept according to the invention provides, therefore, a suitable solution to deviations in height which may occur.

The goods truck, in particular silo trucks, according to the invention can be made of aluminum alloys or steel.

What is claimed is:

1. Covered goods truck which comprises a silo truck superstructure made up of interconnected longitudinal walls, end walls and floor designed as a self-supporting body that twists relatively easily, a roof covering said superstructure including at least one longitudinal part which is attached to one of said longitudinal walls and, with respect to the end walls and the other of said longitudinal wall, exhibits freedom of movement in the longitudinal direction which accommodates the twisting action while the truck is in motion.

2. Goods truck according to claim 1 wherein the end walls run up to roof height and feature at the top a section which permits the longitudinal parts of the roof to be supported such that they can be displaced in the longitudinal direction.

3. Covered goods truck which comprise a truck superstructure made up of interconnected longitudinal walls, end walls and floor designed as a self-supporting body that twists relatively easily, a roof covering said superstructure including at least one longitudinal part which is attached to one of said longitudinal walls and, with respect to the end walls and the other of said longitudinal wall, exhibit freedom of movement in the longitudinal direction which accommodates the twisting action, wherein the roof is one single part having two long edges and is joined at one long edge to a longitudinal wall and rests its free long edge on the second longitudinal wall of the superstructure such that it can be displaced in the longitudinal direction.

4. Covered goods truck which comprises a truck superstructure made up of interconnected longitudinal walls, end walls and floor designed as a self-supporting body that twists relatively easily, a roof covering said superstructure including at least one longitudinal part which is attached to one of said longitudinal walls and, with respect to the end walls and the other of said longitudinal wall, exhibits freedom of movement in the longitudinal direction which accommodates the twisting action, wherein the roof features at least two longitudinal parts each of which is attached to one longitudinal wall, is displaceable with respect to the other longitudinal wall in the longitudinal direction and, at a distance from at least one longitudinal wall is supported on the truck superstructure and such that they can be displaced in the longitudinal direction.

5. Goods truck according to claim 4 wherein said longitudinal parts are directly supported on the truck superstructure.

6. Goods truck according to claim 4 wherein said longitudinal parts are indirectly supported on the truck superstructure.

7. Goods truck according to claim 4 wherein said longitudinal parts are supported on the end walls of the superstructure.

8. Goods truck according to claim 4 wherein at least one additional longitudinal roof part is situated between the said longitudinal roof parts and is moveable in the longitudinal direction with respect to said longitudinal roof parts, wherein said longitudinal roof parts are attached to the longitudinal walls.

9. Goods truck according to claim 32 wherein said longitudinal roof parts have long edges which can be displaced longitudinally with respect to each other and which overlap.

10. Goods truck according to claim 9 wherein said longitudinal edges overlap by means of a bent-over edge which engages with play in a gutter for rain water.

11. Covered goods truck which comprises a truck superstructure made up of interconnected longitudinal walls, end walls and floor designed as a self-supporting body that twists relatively easily, a roof covering said superstructure including at least one longitudinal part which is attached to one of said longitudinal walls and, with respect to the end walls and the other of said longitudinal wall, exhibits freedom of movement in the longitudinal direction which accommodates the twisting action, wherein at least one charging port is provided in said at least one longitudinal roof part.

12. Goods truck according to claim 11 wherein said longitudinal roof part has a top part and wherein said at least one charging port is provided.

13. Covered goods truck which comprises a truck superstructure made up of interconnected longitudinal walls, end walls and floor designed as a self-supporting body that twists relatively easily, a roof covering said superstructure including at least one longitudinal part which is attached to one of said longitudinal walls and, with respect to the end walls and the other of said longitudinal wall, exhibits freedom of movement in the longitudinal direction which accommodates the twisting action, wherein said at least one longitudinal roof part is supported at a distance from the longitudinal walls to which it is attached, and this by at least one of articulated pivot arms, rollers and sliding layers which in turn are supported by component parts of the truck superstructure.

14. Goods truck according to claim 13 wherein said at least one roof part is supported by upper girders of the longitudinal walls.

15. Goods truck according to claim 13 wherein said at least one roof part is supported by dividing walls.

16. Covered goods truck which comprises a truck superstructure made up of interconnected longitudinal walls, end walls and floor designed as a self-supporting body that twists relatively easily, a roof covering said superstructrue including at least one longitudinal part which is attached to one of said longitudinal walls and, with respect to the end walls and the other of said longitudinal wall, exhibits freedom of movement in the longitudinal direction which accommodates the twisting action, wherein the end walls are the same height as the longitudinal walls and the distance up to the roof therefrom is closed by rigid cover sheets which are attached to the longitudinal parts of the roof, and can with respect to the end walls be displaced with these longitudinal parts in the longitudinal direction when twisting of the superstructure occurs.

17. Covered goods truck which comprises a truck superstructure made up of interconnected longitudinal walls, end walls and floor designed as a self-supporting body that twists relatively easily, a roof covering said superstructure including at least one longitudinal part which is attached to one of said longitudinal walls and, with respect to the end walls and the other of said longitudinal wall, exhibits freedom of movement in the longitudinal direction which accommodates the twisting action, wherein the end walls are the same height as the longitudinal walls, and the distance up to the roof therefrom is closed by deformable cover sheets the lower and upper edges of which are held in channels on the end walls and the longitudinal roof parts.

18. Goods truck according to claim 17 wherein the lower and upper edges are directly held in said channels.

19. Goods truck according to claim 17 wherein the lower and upper edges are held in said channels by edge sections.

* * * * *